May 21, 1929.　　R. F. VERDIN ET AL　　1,713,573
CABINET HEATER
Filed May 14, 1926
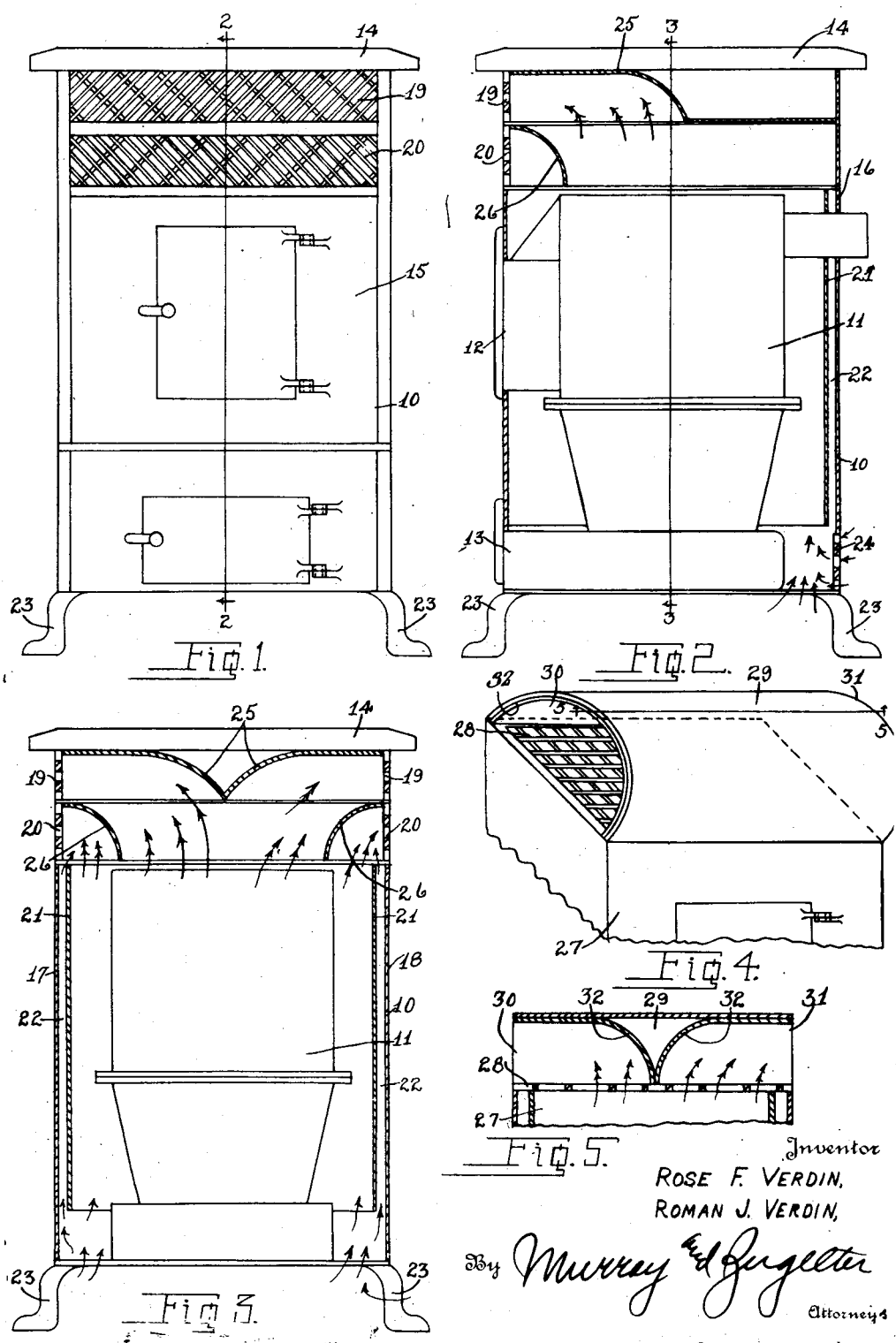
Inventor
ROSE F. VERDIN,
ROMAN J. VERDIN, Patented May 21, 1929.

1,713,573

UNITED STATES PATENT OFFICE.

ROSE F. VERDIN AND ROMAN J. VERDIN, OF JEFFERSONVILLE, INDIANA.

CABINET HEATER.

Application filed May 14, 1926. Serial No. 109,114.

This invention relates to improvements in cabinet heaters or parlor furnaces as they are sometimes called.

An object of our invention is to provide a cabinet heater that will diffuse the heat throughout the room more evenly than the furnaces used heretofore.

Another object of our invention is to provide a device of this type wherein the radiant heat and hot air are prevented from striking the ceiling directly above the heater.

Another object of our invention is to provide a simple and economical means for accomplishing the above objects.

These and other objects are attained by the means described herein and disclosed in the accompanying drawing, in which:

Fig. 1, is a front elevation of a cabinet heater having embodied therein our invention.

Fig. 2, is a sectional view on line 2—2 of Fig. 1.

Fig. 3, is a sectional view on line 3—3 of Fig. 2.

Fig. 4, is a fragmental perspective view of a cabinet heater having a modified device of our invention mounted thereon.

Fig. 5, is a sectional view on line 5—5 of Fig. 4.

Our invention contemplates a cabinet 10 having mounted therein a suitable heating unit 11. The heating unit 11 being provided with the usual feed opening 12 and ash pit opening 13, each being provided with the usual door. The cabinet 10 is provided with a closed top 14, front 15, back 16 and sides 17 and 18. The front 15 and sides 17 and 18 are provided with grilles 19 and 20. The grilles 19 and 20 being mounted in the front and sides adjacent to and below the closed top 14. The cabinet may be provided with a second wall 21 interiorly of the outer casing whereby an air passage 22 is provided intermediate the cabinet 10 and inner wall 21. This air passage being utilized to insulate the cabinet 10 from the heat of the heating unit 11.

The cabinet may be provided with feet 23 whereby fresh air may be drawn from beneath the cabinet as indicated by the arrows. The back 16 of the cabinet may be provided with a grille 24 at the base thereof for drawing fresh air into the interior of the cabinet.

Interiorly of the cabinet and immediately below the top 14 thereof, we have placed deflectors 25 and 26. These deflectors 25 and 26 intercept the radiant heat and heated air and direct said radiant heat and heated air outwardly through the grilles 19 and 20 into the rooms.

The lower deflector 26 also catches and directs some of the cooler air back into the room thereby diffusing the heated air and radiant heat with the atmosphere in the room.

In the modified structure disclosed in Fig. 4, we have illustrated how our device may be mounted upon cabinet heaters or parlor furnaces, that are now generally employed. The heater disclosed in Fig. 4, comprises a cabinet 27 having a perforated or grilled top 28 whereby the radiant heat and heated air pass directly upward from the heater. The curved deflector 29 is mounted on the top of the heater 27 having the ends 30 and 31 thereof open whereby the radiant heat is directed into the room and prevented from striking the ceiling directly above the heater. The deflector 29 may be provided interiorly thereof with curved walls 32 which may assist in turning and directing the flow of radiant heat and heated air.

Heretofore cabinet heaters or parlor furnaces of the type shown at 27 have been used. These furnaces discharge radiant heat and heated air directly upward against the ceiling causing the ceiling and plaster thereof to crack and fall. With a device of our invention this condition is obviated. The radiant heat and heated air passing from the heating unit 11 strikes the deflectors 25 and 26, and is directed into the room through the grilles 19 and 20. The deflectors 26 also direct cool air along with the heated air thereby diffusing the heated air in the room.

The deflectors 25, 26, and 32 may be provided with a bright polished surface for reflecting the radiant heat. The deflectors may be made of sheet aluminum, sheet copper, etc., having the inner surface polished for obtaining a bright surface, or the deflectors may be painted or coated with a heat resisting aluminum paint or the like for reflecting the radiant heat.

What we claim is:

In combination a cabinet heater comprising a casing having side walls and a rear wall, said casing being open at the bottom, a heating unit within the casing, a front wall for the casing having closable openings affording access to the heating unit, an inner wall structure surrounding the heating unit at the sides and rear and providing an opening communicating with the open bottom of the casing, deflector members at the top of the casing and other deflector members spaced below the first mentioned deflectors and extending from the sides of the cabinet to the heating unit.

In testimony whereof, we have hereunto subscribed our names this 12th day of May, 1926.

ROSE F. VERDIN.
ROMAN J. VERDIN.